US008234145B2

(12) United States Patent
Kissner et al.

(10) Patent No.: US 8,234,145 B2
(45) Date of Patent: Jul. 31, 2012

(54) AUTOMATIC COMPUTATION OF VALIDATION METRICS FOR GLOBAL LOGISTICS PROCESSES

(75) Inventors: Jennifer Joy Kissner, Longmont, CO (US); Vikas Krishna, San Jose, CA (US); Scott William Pollyea, Loveland, CO (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1539 days.

(21) Appl. No.: 11/181,007

(22) Filed: Jul. 12, 2005

(65) Prior Publication Data

US 2007/0094057 A1     Apr. 26, 2007

(51) Int. Cl.
*G06Q 10/00* (2012.01)
(52) U.S. Cl. ...................................................... 705/7.27
(58) Field of Classification Search .............. 705/7, 7.27
See application file for complete search history.

(56) References Cited

U.S. PATENT DOCUMENTS

| | | | |
|---|---|---|---|
| 7,386,475 B2 * | 6/2008 | Parasnis et al. .................. 705/26 |
| 2003/0061265 A1 | 3/2003 | Maso et al. | |
| 2003/0187719 A1 | 10/2003 | Brocklebank | |
| 2003/0225603 A1 | 12/2003 | Skibinski | |
| 2004/0102990 A1 * | 5/2004 | Jones ................................ 705/1 |
| 2004/0153329 A1 | 8/2004 | Casati et al. | |
| 2006/0200556 A1 * | 9/2006 | Brave et al. .................... 709/224 |
| 2009/0030948 A9 * | 1/2009 | Lipman et al. ................. 707/200 |
| 2010/0063860 A1 * | 3/2010 | Gallion et al. ..................... 705/9 |

OTHER PUBLICATIONS

S. Srinivasan et al., "Web-Log-Driven Business Activity Monitoring," IEEE Computer Society, pp. 63-70, Mar. 2005.

* cited by examiner

*Primary Examiner* — Andre Boyce
(74) *Attorney, Agent, or Firm* — Shimokaji & Assoc. PC

(57) ABSTRACT

A validation matrix computation system automatically computes a validation matrix to analyze performance and efficiency of a global logistics process. The present system comprises identifying metrics and automatically computing the metrics to derive a validation matrix from the metrics. The system comprises a metric capture module installed at all participant locations in the global logistics process. The metric capture module captures, from logs generated at a node, metrics that measure performance at the node. The system generates the validation matrix from the captured metrics and uses the validation matrix to evaluate performance. The metrics comprise quantitative and qualitative metrics; quantitative metrics are automatically computed by correlating logs generated at the nodes and qualitative metrics are computed using surveys completed by participants in the global logistics process.

18 Claims, 3 Drawing Sheets

AUTOMATIC COMPUTATION OF VALIDATION METRICS FOR GLOBAL LOGISTICS PROCESSES

FIELD OF THE INVENTION

The present invention generally relates to global logistics processes that manage multiple documents across several participants in a global supply chain. More specifically, the present system pertains to a method of analyzing performance of a global logistics process that efficiently creates the entry clearances for the movement of goods in a global supply chain.

BACKGROUND OF THE INVENTION

Many business processes in Public Sector, Financial Services, and ERP processes must coordinate and manage multiple documents for a variety of reasons including legal, compliance, and operational reasons. Such processes often have inherent latencies and inefficiencies in them that can be streamlined. This is because, unlike transactional data, documents are frequently "opaque" to the systems and the participants in the business process. Traditional models for handling documents such as web and email attachments as well as paper based flow from desk to desk need human intervention. Documents are manually retrieved, information manually extracted, and manual updates/cross referencing with Line Of Business applications, introduce inefficiencies in the process. There exist numerous efforts to automate such business processes with different technologies. In order to compare the effectiveness of such automations and implementations, there exists a need for a validation matrix with a standard set of metrics identified for each business process, which can be used to benchmark a specific implementation.

Considering for example, a large corporation with multiple divisions and business processes that aims at introducing new automated application to support a business process and to replace an existing paper-based manual document management process. A department responsible for a document process benefits by converting to an automatic document management process. The automated document management process has the potential of reducing labor and other costs of document management. However, using an automatic document management process requires employees in other departments to use electronic systems instead of paper forms, potentially increasing costs on those other departments. To effectively determine any advantage of changing to an automated system, this estimated cost increase is traded off against any overall efficiency gained by the automated document management system.

One example of a global logistics process is an "Import Compliance" process where the movement of goods across borders of countries must comply with regulations associated with border crossings. This is particularly relevant to Customs and Border Protection agencies where the Service ports serve as back offices of border crossings. Such service ports are typically inundated with documents associated with the customs clearing processes and incorporate significant and complex manual processes related to document handling. Automating the clearance processes using an electronic infrastructure, together with the automatic measurement of the validation metrics, allows the characterization of each service port with a validation matrix that can be used as a standard operational metric. The departments receiving the goods and tracking the movement of the goods gain in efficiency with an automated document management process. The department shipping the goods may lose in efficiency when using an automated document management process because of additional time required to electronically enter and process documents associated with goods.

Due to the different participants and systems used in document management systems, comparing performance of different types of automatic or manual global logistics processes is difficult. Presently, there exists no method for automatically tracking and evaluating performance of an automated logistics process to determine whether the technology provides overall improvement in the logistics operation for a company or user.

What is therefore needed is a system, a computer program product, and an associated method for automatically computing a validation matrix to analyze performance of a global logistics process. The need for such a solution has heretofore remained unsatisfied. The infrastructure supporting the global logistics process may include a combination of tools and technologies such as a document management system, front end adaptors, business rules engines and backend adaptors. Whatever be the choice of the solution, it remains critical to be able to measure the overall efficiency of the logistics operation using a standard set of metrics.

SUMMARY OF THE INVENTION

The present invention satisfies this need, and presents a system, a computer program product, and an associated method (collectively referred to herein as "the system" or "the present system") for automatically computing a validation matrix to analyze performance of a global logistics process.

In general, the present invention relates to global logistics processes that manage multiple documents across several participants in a global supply chain. More specifically, the present system pertains to a method of analyzing performance of a global logistics process that efficiently handles the documents involved in the movement of goods in a global supply chain. The present system supports the entire logistics operation from start to end using a common repository to support the creation and linking of all documents related to a logistics operation. All processing of documents at each node generates logs that can then be analyzed to automatically compute metrics that can be used to benchmark global logistics operations.

One embodiment of the present invention describes a novel method for quantifying the efficiency of global logistics processes that deal with the coordinated movement of goods, data and documents in a global supply chain. The method identifies the metrics that are relevant to computing a validation matrix associated with a document-centric logistics process, and discloses a method for automating the computation of the metrics related to the validation matrix.

The present system comprises identification of metrics that can be monitored in a global logistics process implemented using a document management system. The present system further comprises a method to automatically compute the validation matrix from the identified metrics. The validation matrix standardizes performance measurements, enabling comparison of performance of different implementations of a global logistics process. The validation matrix quantifies performance of such document processes that deal with the coordinated movement of goods, data, and documents in a global supply chain.

A global logistics process captures documents to obtain information and execute actions such as business logic based on the information obtained from the processed documents. Each point at which documents are processed is a node. The present system enables identification of metrics associated with document centric global logistics processes implemented using a document management system; these metrics are used as a standard to rate performance and efficiency of nodes. The present system further comprises automatically computing the identified metrics by automatically correlating metrics obtained from logs electronically generated at the nodes. The present system generates the validation matrix from the metrics; the validation matrix is used to compare performance of global logistics processes.

The identified metrics comprise quantitative and qualitative metrics. The quantitative metrics are automatically computed by the present system by correlating logs generated at the nodes. Quantitative metrics comprise, for example:

Cycle time of process normalized by number of nodes;
Document delivery time;
Number of missing documents;
Classification errors;
Census errors;
Post entry adjustments;
Number of data entry errors; and
Broker fees.

Cycle time is computed by taking the difference between the time at which the goods originate at node 1 and the time at which the goods clear customs and documentation is complete at node n, normalized by n (number of nodes). The cycle time is calculated by manually logging the start and end times in the manual process and by automatically correlating logs of the system used at the n locations in the transformed new process.

Document delivery time is the elapsed time between when documents are ready at node n and documents can be reviewed at node n+1.

Number of missing documents is the total number of documents expected but did not make it between node n and n+1.

Classification errors & Census errors are process errors due to bad or missing information in the documents.

Post entry adjustments represents adjustments made to complete a transaction due to the above two errors.

Number of data entry errors are mistakes made when transferring data from a paper document to the process system.

The broker fees are fees charged by a broker, for example, to process the shipment through customs for the importer.

The qualitative metrics are computed using surveys completed by participants in the process. Qualitative metrics comprise, for example:

Document quality (fidelity);
Relationship with partners/agencies; and
Customer satisfaction.

Document quality references the quality of documents received, for example, by clients, partners, agencies, or other persons requiring information from a document; i.e., whether the document is legible. In a manual logistics process, for example, documents often arrive torn or otherwise mutilated such that the document is partially or completely illegible.

Relationship with partners/agencies reflects whether the document flow is affecting interaction between a company utilizing the document management process and, for example, clients, partners, agencies, or other persons requiring information from a document. For example, a series of torn or mangled documents may require a partner or an agent to track down original documents, adversely affecting a relationship between the partner or agent and the company using the document management system. Customer satisfaction reflects a level of satisfaction by clients, partners, agencies, or other persons that are accessing documents processed by a document management system.

The present system comprises metric capture modules installed on at least some of the nodes in a global logistics process infrastructure. The present system further comprises a node manager. The node manager receives captured metrics from the metric capture modules. The node manager generates a validation matrix from the captured metrics and compares the validation matrix with one or more other validation matrices such as, for example, an optimum validation matrix or a validation matrix representing a previous document management system. Comparing the validation matrix with an optimum validation matrix enables tuning of the document management system to improve performance. Comparing the validation matrix with a previous validation matrix enables quantification of savings and improved efficiency in implementing, for example, an automatic document management system.

The ability of the present system to automatically measure performance of additional document management processes allows analysis of several different architectures of a document management system before production level implementation. The validation matrix of the present system generated for the document management process enables objective comparison of the different implementations of a document management system. The present system further enables benchmarking of various document management processes as an optimum-practice method based on the validation matrix.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
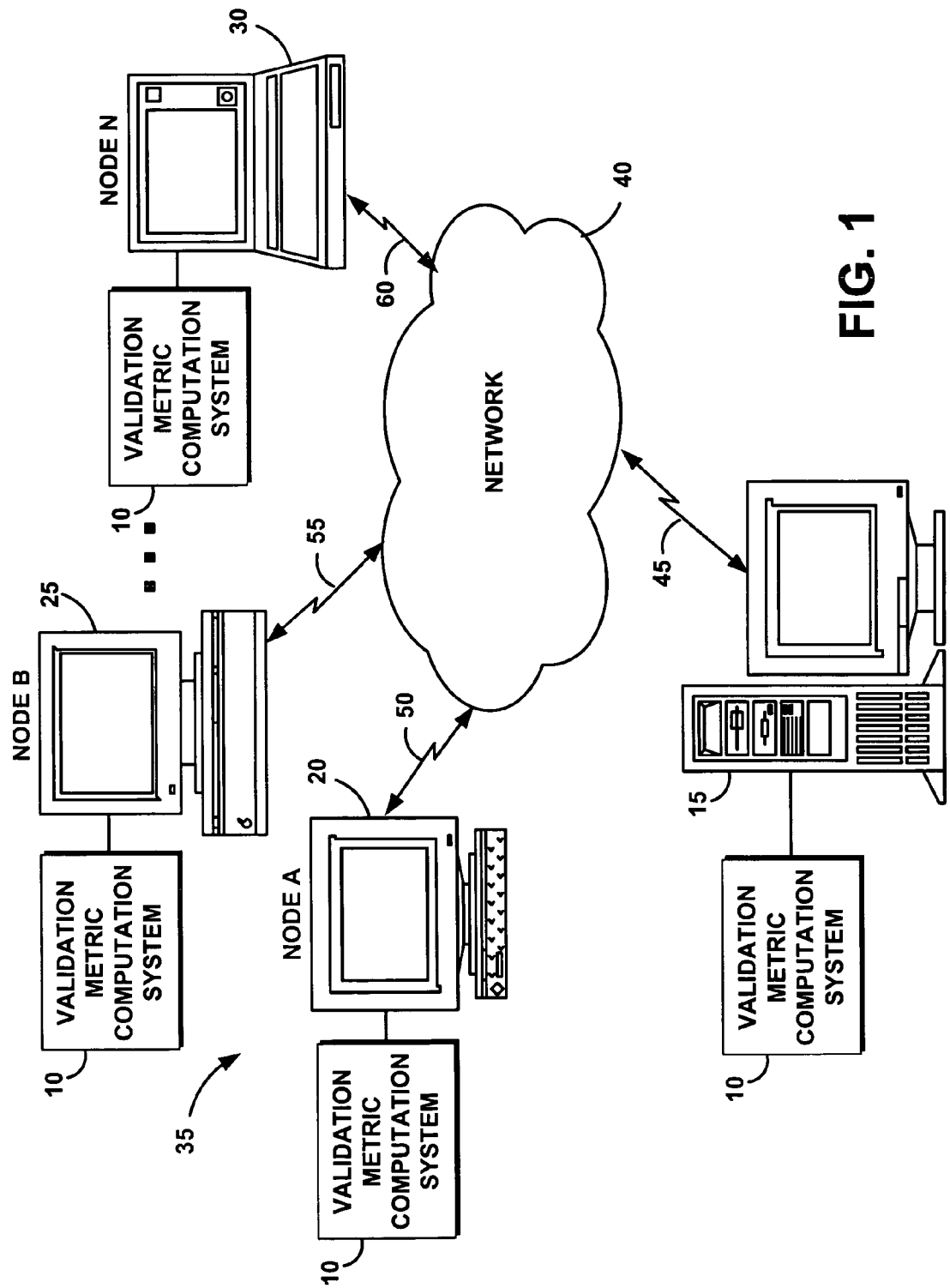
FIG. 1 is a schematic illustration of an exemplary operating environment in which a validation matrix computation system of the present invention can be used.

FIG. 1 portrays an exemplary overall environment in which a system, a computer program product, and an associated method ("the system 10") for automatically computing a validation matrix to analyze performance of a document management system according to the present invention may be used. System 10 includes a software programming code or computer program product that is typically embedded within, or installed on a host server 15. Alternatively, system 10 can be saved on a suitable storage medium such as a diskette, a CD, a hard drive, or like devices.

A document management system comprises nodes represented by node A, 20, node B, 25, through node N, 30 (collectively referenced as nodes 35). Each of the nodes 35 represents a point in a document management system at which a document is processed by, for example, entering the document into the system, extracting information from the document, etc. System 10 is installed on each of the nodes 35 to capture metrics that measure performance of the document management system. As used herein, metric represents a quantifiable measure or parameter.

The host server 15 can access nodes 35 through a network 40. Nodes 35 each comprise software that allows the each of the nodes 35 to interface securely with the host server 15. The host server 15 is connected to network 40 via a communications link 45 such as a telephone, cable, or satellite link. Node A, 20, node B, 25, through node N, 30 can be connected to network 40 via communications links 50, 55, through communications link 60, respectively. While system 10 is described in terms of network 40, nodes 35 may also access system 10 locally rather than remotely. Nodes 35 may access system 10 either manually, or automatically through the use of an application.

Figure 2:
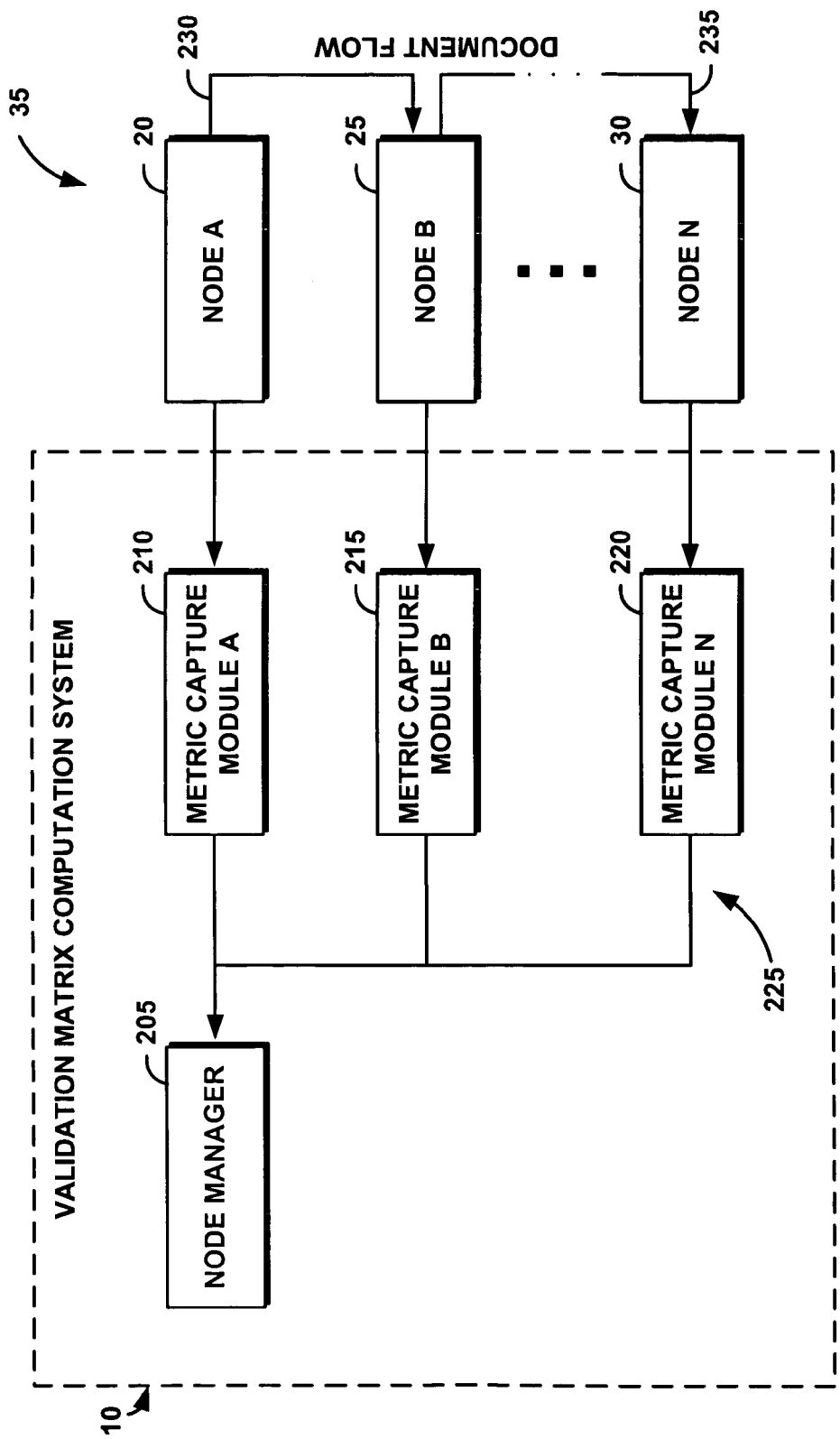
FIG. 2 is a block diagram of the high-level architecture of the validation matrix computation system of FIG. 1.

FIG. 2 illustrates a high-level architecture of system 10. System 10 comprises a node manager 205. System 10 further comprises a metric capture module A, 210, a metric capture module B, 215, through a metric capture module N, 220 (collectively referenced as metric capture modules 225). One of the metric capture modules 225 is installed on each of some or all of the nodes 35. The metric capture modules 225 capture performance metrics as documents propagate through a document management system.

Documents propagate through nodes 35 from one node to another. For example, a document is entered at node A, 20. The document propagates to node B, 25, along path 230. Information is extracted from the document at node B, 25. Other documents are added to the document flow at node B, 25. The document, information extracted from the document, and other documents propagate to node N, 30, along path 235.

Figure 3:
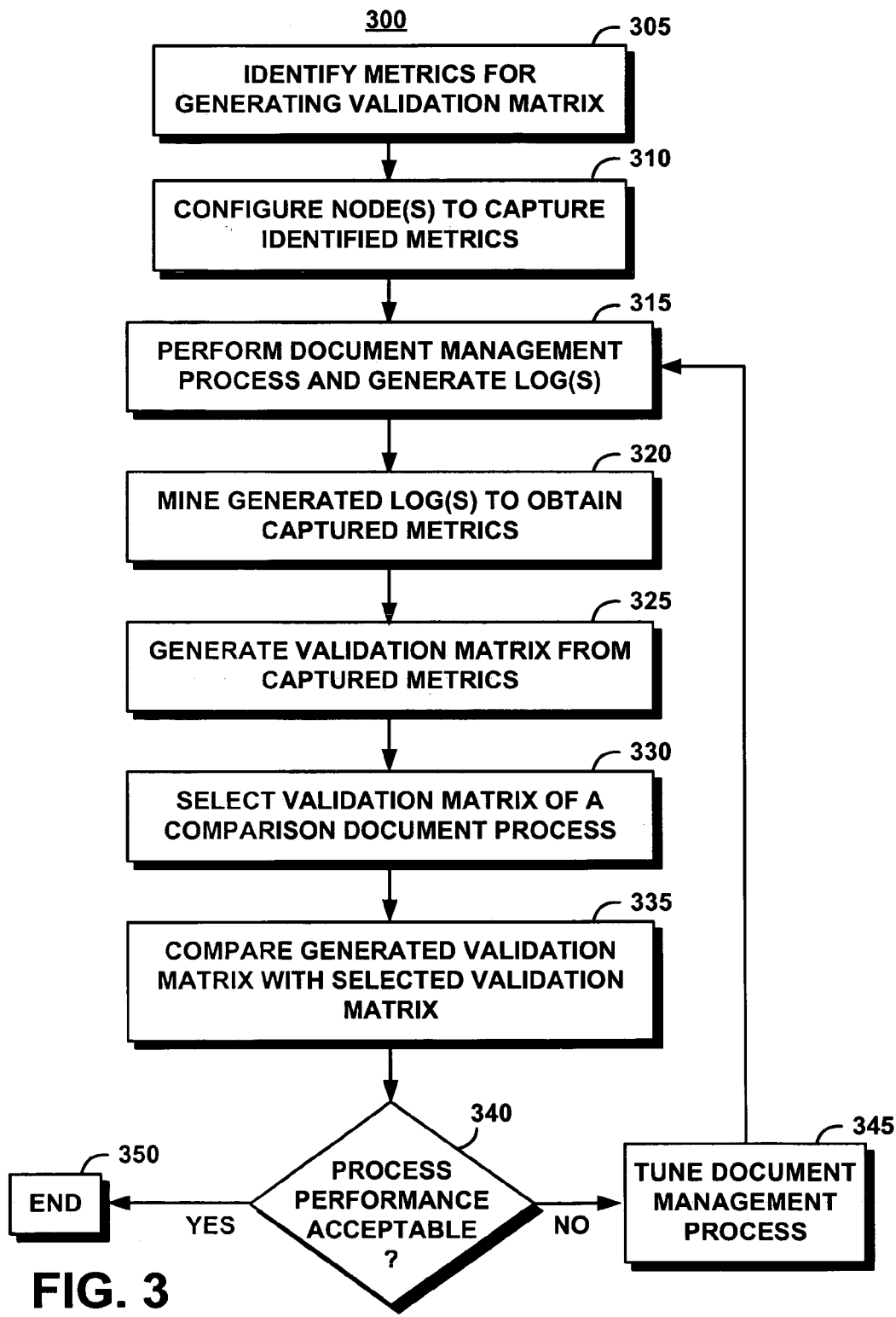
FIG. 3 is a process flow chart illustrating a method of operation of the validation matrix computation system of FIGS. 1 and 2.

FIG. 3 illustrates a method 300 of system 10. System 10 identifies metrics used to generate the validation matrix (step 305). Identifying metrics comprises analyzing a document management process to identify measurements that quantify performance of the document management system. One or more selected nodes 35 are configured to capture identified metrics (step 310), installing one of the metric capture modules 225 on each of the selected nodes 35. Each of the selected nodes 35 generates a log that comprises content and metadata. The log records, for example, document movement. The log further records document characterizations such as errors in the document, missing documents in a document packet, etc. The process of installing the metric capture modules 225 comprises specifying values generated by the logs at each of the selected nodes 35. Formats and characteristics of the logs generated at each of the selected nodes 35 may be varied; system 10 does not require uniformity in logs.

Exemplary values recorded in the logs are as follows:
Cycle time of process normalized by number of nodes=2 hours
    Document Delivery Time=1 hour
    Number of missing documents=0
    Classification errors=1
    Census errors=3
    Post entry adjustments=4
    Number of data entry errors=0

A document management system monitored by system 10 performs an associated document management process and generates one or more logs at each of the selected nodes 35 (step 315). System 10 aggregates the logs and data mines the generated logs to obtain metrics captured in the logs by the metric capture modules 225 (step 320). System 10 generates a validation matrix from captured metrics (step 325).

The validation matrix comprises quantitative and qualitative metrics. Quantitative metrics comprise, for example:
    Cycle time of process normalized by number of nodes;
    Document delivery time;
    Number of missing documents;
    Classification errors;
    Census errors;
    Post entry adjustments;
    Number of data entry errors; and
    Broker fees.

The qualitative metrics are computed using surveys completed by participants in the process. The qualitative metrics are not input into the system but used to rank the overall process as yet another way of measuring the process quality. They may be assigned weights to compute the overall process efficiency score. Qualitative metrics comprise, for example:
    Document quality (fidelity);
    Relationship with partners/agencies; and
    Customer satisfaction.

System 10 selects a validation matrix of a comparison document process (step 330). The selected validation matrix may be, for example, an optimum validation matrix, a validation matrix generated by analyzing a document management system formerly used, or any other validation matrix representing performance of any other document management system.

System 10 compares the generated validation matrix with the selected validation matrix (step 335) to analyze performance of the document management system with, for example, an optimum performance or performance of a previously utilized document management system. A client may, for example, compare performance of an automated document management system with a previously used manual document management system to quantify performance improvements. The quantified performance improvements can be used, for example, to negotiate broker rates or as a marketing feature.

System 10 determines whether performance is acceptable compared with the selected validation matrix (decision step 340). If performance is not acceptable, the comparison of step 335 identifies points at which a client can tune the document management process to improve performance. The client tunes the document management process (step 345) and repeats step 315 through step 345 until performance is acceptable (decision step 340). When performance is acceptable, method 300 ends (step 350).

An exemplary application of system 10 to a document management process is an import compliance process for a specific manufacturing lane. For example, a logistics operation comprises goods originating in Mexico (node 1), entering the United States into Laredo, Tex. (node 2), and moving to a destination at Boulder, Colo. (node 3). System 10 automatically calculates the specific metrics for this process and generates a validation matrix that can be used to compare various processes.

System 10 computes the cycle time for the import compliance process as: difference between time at which the goods originate at node 1 and the time at which the goods clear customs and documentation is complete at node 3, normalized by 3 (number of nodes in the import compliance process). The start time at node 1 (origination of the goods) is logged at node 1. The end time at node 3 (arrival of the goods) is logged at node 3. System 10 automatically correlates logs of the system used at the "n" locations (i.e., three locations) in the document management process.

System 10 computes document delivery time as elapsed time between when documents are ready at a node "i" and documents can be reviewed at a node "i+1". System 10 computes the number of missing documents as the number of entries that have a document missing at the end of the document management process.

System 10 computes a number of data entry errors as a number of instances in which data in the document (i.e., invoice number, etc) does not match a corresponding value in the associated document. The broker fees are identified as the fee per entry of goods charged by a broker.

In this exemplary application of system 10 to an import compliance process, qualitative metrics are collected using a survey on, for example, a scale of 1 to 5, with, for example, 5 ranking higher than 1.

The validation matrix generated by system 10 for the import compliance process can serve as a standard to measure performance of the import compliance process. The validation matrix can further be used to characterize the efficiency of a specific import compliance process It is to be understood that the specific embodiments of the invention that have been described are merely illustrative of certain applications of the principle of the present invention. Numerous modifications may be made to the system and method for automatically computing a validation matrix to analyze performance of a document management system described herein without departing from the spirit and scope of the present invention. Moreover, while the present invention is described for illustration purpose only in relation to documents, it should be clear that the invention is applicable as well to, for example, any item that can be electronically transmitted and containing information that can be processed.

What is claimed is:

1. A method of automatically computing a current validation matrix to analyze the performance of a document-centric business process to benchmark and compare multiple implementations of the document-centric business process using a common set of metrics, comprising:
   identifying the common set of metrics associated with selected operations in the document-centric business process;
   configuring a plurality of nodes in a document-centric business process to generate a plurality of logs;
   automatically, by use of an apparatus, computing the identified common set of metrics by data mining the logs;
   generating the current validation matrix from the automatically computed common set of metrics, to quantify the performance of the document-centric business process, wherein the current validation matrix comprises cycle time of process normalized by a number of nodes, document delivery time, number of missing documents, classification errors, census errors, post entry adjustments, number of data entry errors, and broker fees;
   comparing the current validation matrix with a previously determined validation matrix to analyze performance of the document-centric business process;
   identifying improvable areas of the document-centric business process from the comparison of the current validation matrix with the previously determined validation matrix;
   modifying the document-centric business process in response to unacceptable performance of the document-centric business process; and
   repeatedly generating the current validation matrix and modifying the document-centric business process until performance of the document-centric business process is determined to be acceptable.

2. The method of claim 1, wherein the document-centric business process comprises a global logistics process, the method including computing an overall efficiency score of the document-centric business process, wherein the overall efficiency score is computed by assigning weights to qualitative metrics comprising document quality, relationships with partners, and customer satisfaction.

3. The method of claim 2, wherein the selected operations comprise logistics operations.

4. The method of claim 1, wherein the current validation matrix comprises objective, quantitative metrics.

5. The method of claim 4, wherein the current validation matrix comprises subjective, qualitative metrics.

6. The method of claim 5, including automatically computing the quantitative metrics.

7. The method of claim 5, further comprising manually computing the qualitative metrics using surveys completed by participants in the process.

8. A computer program product having a plurality of executable instruction codes that are stored on a computer-readable medium, for automatically computing a current validation matrix to analyze the performance of a document-centric business process to benchmark and compare multiple implementations of the document-centric business process using a common set of metrics, comprising:
   instruction codes for identifying the common set of metrics associated with selected operations in the document-centric business process;
   instruction codes for configuring a plurality of nodes in a document-centric business process to generate a plurality of logs for each of the plurality of nodes;
   instruction codes for aggregating the plurality of logs generated for each of the plurality of nodes;
   instruction codes for automatically computing the identified common set of metrics by data mining the logs;
   instruction codes for generating the current validation matrix from the automatically computed common set of metrics, to quantify the performance of the document-centric business process, wherein the current validation matrix comprises census errors, post entry adjustments, number of data entry errors, and broker fees;
   instruction codes for modifying the document-centric business process based upon the validation matrix;
   instruction codes for comparing the current validation matrix with a previously determined validation matrix to analyze performance of the document-centric business process;
   instruction codes for identifying improvable areas of the document-centric business process from the comparison of the current validation matrix with the previously determined validation matrix;
   instruction codes for modifying the document-centric business process in response to unacceptable performance of the document-centric business process; and
   instruction codes for repeatedly generating the current validation matrix and modifying the document-centric business process until performance of the document-centric business process is determined to be acceptable.

9. The computer program product of claim 8, wherein the document-centric business process comprises a global logistics process, and wherein the computer program product includes instruction codes for generating a new validation matrix by analyzing a different document management system formerly used, including comparing the performance of an automated document management system with a previously used manual document management system.

10. The computer program product of claim 9, wherein the selected operations comprise logistics operations.

11. The computer program product of claim 8, wherein the current validation matrix comprises objective, quantitative metrics.

12. The computer program product of claim 11, wherein the current validation matrix comprises subjective, qualitative metrics, and wherein the qualitative metrics comprise document quality, relationships with partners, and customer satisfaction.

13. The computer program product of claim 12, wherein the quantitative metrics comprise any one or more of: cycle time of process normalized by a number of nodes; document delivery time; number of missing documents; and classification errors.

14. The computer program product of claim 13, wherein the computer program product includes instruction codes for automatically computing the quantitative metrics.

15. A system for automatically computing a current validation matrix to analyze the performance of a document-centric business process to benchmark and compare multiple implementations of the document-centric business process using a common set of metrics, said system comprising: at least one hardware component, said at least one hardware component including:

a plurality of metric capture modules configured to:

identify the common set of metrics associated with selected operations in the document-centric business process;

configure a plurality of nodes in a document-centric business process to generate a plurality of logs, wherein the logs record document movement, document errors, and missing documents in a document packet;

automatically correlate the logs from the plurality of nodes with each other; and automatically compute the identified common set of metrics by data mining the logs; and a node manager configured to:

generate the current validation matrix from the automatically computed common set of metrics, wherein the current validation matrix comprises cycle time of process normalized by a number of nodes, document delivery time, number of missing documents, classification errors, census errors, post entry adjustments, number of data entry errors, and broker fees;

quantify the performance of the document-centric business process, compare the current validation matrix with a previously determined validation matrix to analyze performance of the document-centric business process;

identify improvable areas of the document-centric business process from the comparison of the current validation matrix with the previously determined validation matrix;

modify the document-centric business process in response to unacceptable performance of the document-centric business process; and repeat generation of the current validation matrix; and modify the document-centric business process until performance of the document-centric business process is determined to be acceptable.

16. The system of claim 15, wherein:

the document-centric business process comprises a global logistics process, and the selected operations comprise logistics operations in which documents are added at different ones of the plurality of nodes in the system, and documents propagate to the different ones of the plurality of nodes, with different actions performed on the documents at the different ones of the plurality of nodes.

17. The system of claim 15, wherein the validation matrix comprises any one or more of:

a plurality of objective, quantitative metrics; and a plurality of subjective, qualitative metrics.

18. The system of claim 17, wherein the metric capture modules are configured to automatically compute the quantitative metrics.

* * * * *